United States Patent

Heckel et al.

[11] Patent Number: 5,920,715
[45] Date of Patent: Jul. 6, 1999

[54] SYSTEM ARCHITECTURE PERMITTING VERIFIED AND UNVERIFIED PROGRAMS TO EXECUTE SAFELY ON ONE PROCESSOR

[75] Inventors: Andreas Heckel, Waiblingen; Roland Rupp, Hattenhofen; Christoph Weishaar, Waiblingen; Klaus Wohnhaas, Stuttgart, all of Germany

[73] Assignee: PIlz GmbH & Co., Ostfildern, Germany

[21] Appl. No.: 08/894,859

[22] PCT Filed: Feb. 1, 1996

[86] PCT No.: PCT/DE96/00145

§ 371 Date: Aug. 5, 1997

§ 102(e) Date: Aug. 5, 1997

[87] PCT Pub. No.: WO96/24891

PCT Pub. Date: Aug. 15, 1996

[30] Foreign Application Priority Data

Feb. 10, 1995 [DE] Germany ............................ 195 04 404

[51] Int. Cl.⁶ .................................................... G06F 13/00
[52] U.S. Cl. ............... 395/680; 395/800.28; 395/800.31; 395/800.36; 395/200.43; 395/200.8; 364/132
[58] Field of Search ............................... 395/680, 800.28, 395/800.31, 800.36, 200.43, 200.8, 800; 364/132

[56] References Cited

U.S. PATENT DOCUMENTS 4,484,270 11/1984 Quernemoen ........................... 364/200
4,568,866 2/1986 Floro et al. ............................... 318/696
4,953,074 8/1990 Kametani et al. ....................... 364/132
5,386,360 1/1995 Wilson et al. ........................... 364/146
5,774,721 6/1998 Robinson ................................ 395/683

FOREIGN PATENT DOCUMENTS 0 298 396 1/1989 European Pat. Off. .

OTHER PUBLICATIONS

Michael Zilker, *Praxis des Multitasking*, Franzis–Verlag, Munich, 1987, pp. 11–14.

G.B. Williams, *Troubleshooting on Microprocessor Based Systems*, Pergamon Press, 1984, pp. 9–12.

*Primary Examiner*—Christopher B. Shin
*Attorney, Agent, or Firm*—Nilles & Nilles SC

[57] ABSTRACT

A system architecture uses at least two processors (2, 3), which jointly control a process and constantly compare their data with each other. A program complex which has been checked with respect to the possible errors, as well as a non-checked program complex, runs on one of the two processors (2). In order to rule out interference in the checked program complex by the non-checked one, the peripheral hardware (12) which interact with the checked program complex are provided with inhibit inputs (16), and the tested program complex, via the inhibit inputs (16), blocks the peripheral hardware (12) which are reserved for it before it gives up command to the non-checked program complex.

22 Claims, 2 Drawing Sheets

SYSTEM ARCHITECTURE PERMITTING VERIFIED AND UNVERIFIED PROGRAMS TO EXECUTE SAFELY ON ONE PROCESSOR

BACKGROUND OF THE INVENTION

1. Field of the Invention

The operation of machines is being automated to an increasing extent, specifically also that of machines which, because of the large number of independent axes, have a significant control system complexity. In order to rule out hazards for humans and machines as far as possible, these control systems have to be safe to a very high degree, at least with respect to those control instructions whose erroneous actuation can have catastrophic consequences for the humans or the machines.

In the past, one has relied essentially on relay technology in this case, under the assumption that relays and contactors are comparatively safe control means. However, even in the case of this technology, redundancy and a type of test programs had to be provided, by means of which the relays have been reciprocally monitored or checked with respect to their functioning. The outlay on relays, even for comparatively simple control systems of, for example, eccentric-shaft presses, was enormous from the point of view of the space requirement. More complex safe control systems, which are able to detect errors and, when the error is detected, to stop the installation on the safe side, can virtually not be managed at all in relay technology because of the space requirement.

For this reason, a change was made to constructing the control system with electronic components instead of electromechanical components, although there was an awareness that electronic components are more sensitive to external influences, under certain circumstances, and more complicated errors can occur. In order to manage these difficulties to a certain extent, the control systems were designed with multiple channels, the channels monitoring one another mutually.

2. Description of the Related Art

With automation progressing still further, the transition to microprocessor-controlled installations was necessary, which further adds a further grade of errors, namely software errors.

The implementation of control systems with the aid of microprocessors and programs only makes sense, however, when it is simultaneously made possible for the user to expand the control systems and to take into the control systems further machines or machine movements which, under certain circumstances, are also not relevant to safety. In this case, this program part controlling functions which are not necessarily safe must in no way influence that program part which is supervising safe functions. Otherwise, it would be possible for grave disturbances to arise, the causes of which are virtually not to be found, since under certain circumstances they are dependent on the time correlation of specific input signals.

In addition, it forms part of the prior art to allow a plurality of programs to run on one processor, nested in time, as is described by Zilker in the book "Praxis des Multitasking" [Multitasking in practice], Franzis' Verlag, Munich, 1987, pages 11 to 14. To this end, the individual programs which alternate one after another are written in such a way that after a predetermined time, generally controlled by an interrupt, they freely give back the processor, for example to a system core, which then starts a program which is similar with respect to its processor behavior.

It is furthermore known, via so-called inhibit inputs, to block components or groups of components in a computer control system, in order to prevent these components taking over items of information which are offered to them, for example via a bus line, and are intrinsically intended for other components. One example for such a circuit is described by Williams in "Trouble-shooting on Microprocessor based Systems", Pergamon Press, 1984, pages 9 to 12.

Furthermore, US-A-4 484 270 discloses a central control unit which is provided for use with a large number of data processing systems. Each of these data processing systems can be subdivided into further units, each of which in turn itself has the property of a data processing system. All these units access common peripheral devices via an interface subsystem.

OBJECTS AND SUMMARY OF THE INVENTION

In order to remove individual units or devices from availability, that is to say to decouple them electrically and in terms of information technology, the individual interface circuits may be optionally blocked.

Based on this, the object of the invention is to provide a system architecture which permits programs which have been checked for safety and programs which have not been checked for safety to run on one processor, without there being the risk that the non-checked program can influence the running of the tested program in an undesired way or can interfere with it.

According to the invention, this object is achieved by the system architecture having the features of claim 1.

For reasons of electrical complexity and the outlay on components, it is practical to allow two different program complexes to run in one and the same processor, there always having to be monitoring as to how the two program complexes interact with each other. By means of the use of peripheral devices which are equipped with inhibit inputs, it can be ensured that the second program complex is not able to output to the peripheral means any commands of which the first program complex has no knowledge. If, for example, the first program complex is a safe, verified program complex, then, before it gives up the processor or computer core to the second program complex, it switches the peripheral means which are assigned to it and to be commanded only by it into a state in which they do not accept any commands at their inputs and outputs. Read access to the registers of these peripheral means can in this case remain continuously admissible. If, following the blocking of these peripheral means, the second program complex obtains the processor or computer core, it is able to run there essentially autonomously. If as a result of programming errors or other errors in the data the second program complex attempts to make write access to the peripheral means of the first complex in a non-conformal way, the blocked peripheral means will ignore these inputs provided to them and not execute them.

The only error which can still occur would be that the second program complex withdraws the inhibit signal, whereupon the relevant peripheral means which belong to the first program complex would erroneously take notice of the commands from the second program complex.

However, as soon as the second program complex releases the processor, either freely because it has arrived at an appropriate program point, or forcibly because of an interrupt coming from the outside, the first program complex obtains knowledge about this hostile behavior of the second program complex, by interrogating the state of the inhibit line. If in so doing it detects manipulations on the inhibit line, it has the possibility of stopping the entire system to which the system architecture belongs in an orderly fashion.

Of course, the new system architecture is inter-linked with further safeguarding means in order to make the safety as high as possible. To this extent, the system architecture described is only a detail from an overall system to be viewed as safe, whose safety is ensured by reciprocal interrogation and checking of adjacent channels and their data in the known manner.

Depending on the application, it may be that the first peripheral means are reserved exclusively for the first program complex, or that among the first peripheral means there is at least one to which it is permissible to have write and/or read access from both program complexes.

Depending on how the two program complexes are intended to relate to each other, it may be expedient to have a storage area via which the two program complexes communicate with each other, since they only have the processor one after another, that is to say consequently can also not operate simultaneously. For this reason they need a common "mailbox", via which they can exchange messages or data.

This store, serving for communication between the program complexes, is preferably accommodated in the second storage means, since by this means it is necessarily ensured that the data and commands of the first program complex, which are located in the first storage means, cannot be changed by erroneous behavior of the second program complex.

A particularly safe system is obtained if the first storage means are reserved exclusively for the first program complex. The same can in principle exist for the second program complex as well, so that a further storage area is provided as a communication area for the program complexes.

If specific errors can be detected by other measures, it is possible for the two storage means to be accommodated in hardware terms in one and the same store and to be separated from one another only via addresses. If, on the other hand, account also has to be taken of errors in the addressing of the store, or other errors in the stores are to be feared, it is advantageous if stores which are separated in terms of hardware are used for the first and the second storage means, that is to say the first and the second storage means are accommodated in separate storage chips.

As a rule, the first program complex has the higher priority, that is to say, even in the case of non-conformal behavior of the second program complex, it must obtain the processor back within a predefined time, in order to be able to execute its control function. Under certain circumstances, this may not be the case, if the second program complex hangs in an endless loop and no longer reaches that program point at which it freely gives back the processor. In order to exclude such errors, the processor is preferably provided with an interrupt controller to which a timer is connected. As a result, the processor can forcibly remove the second program complex, in order that the first program complex once more comes into the possession of the processor.

The safety of the overall system may be increased if there exists in parallel with the first processor at least one further processor in which a program related to the first program complex runs, so that both the processors or program complexes can continually compare their data and computational results, in order to be able to stop the controlled installation in a practical, non-hazardous manner in the event of a difference in the results.

For example, the program complex running on the second processor can exhibit, from the point of view of the peripheral means assigned to it, the same behavior as the first program complex from the point of view of its peripheral means, but while the two program codes are configured differently. This different configuration of the program codes is necessarily achieved if the first and the second processor are different, for example in terms of register length or of commands available.

Finally, the further processor can be used for the purpose of checking whether, while the first program complex did not have the processor, the second program complex has changed the data at the peripheral means in an inadmissible manner following a change of the signals on the inhibit inputs. Following the return of the first program complex, the latter is able to read the data from the peripheral means and to compare it with the data which the third program complex has obtained from its peripheral means. As soon as a difference occurs there, the system is once more able to stop the controlled machine.

In addition, developments of the invention form the subject matter of subclaims. Furthermore, it can readily be seen that any desired combinations of the subclaims are possible. The structure of the remaining system environment in this case plays no part, or no significant part, in the new system architecture.

BRIEF DESCRIPTION OF THE DRAWINGS

An exemplary embodiment of the subject matter of the invention is illustrated in the drawing, in which.

DESCRIPTION OF THE PREFERRED EMBODIMENTS

Figure 1:
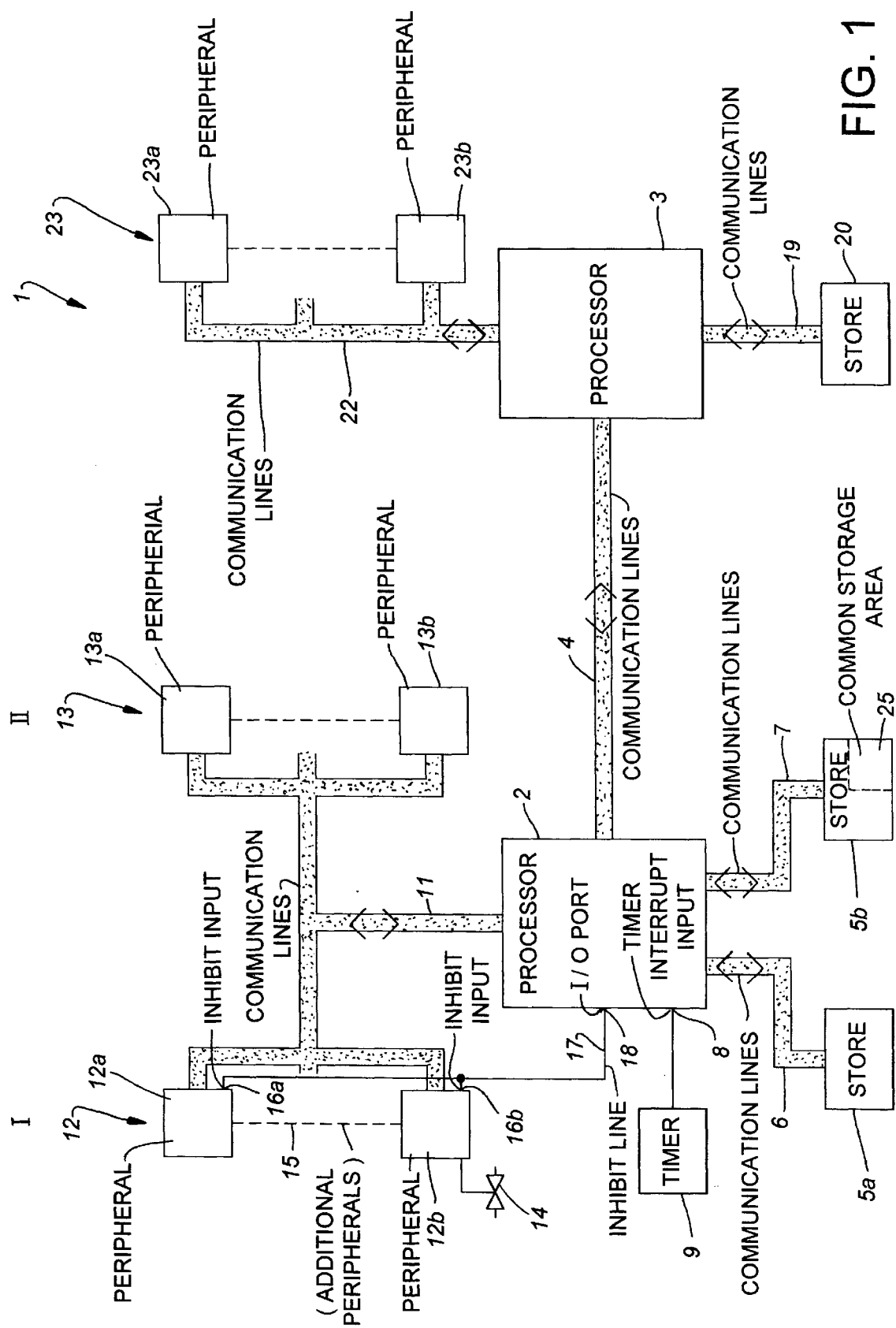
FIG. 1 shows a block diagram of the new system architecture.
Figure 2:
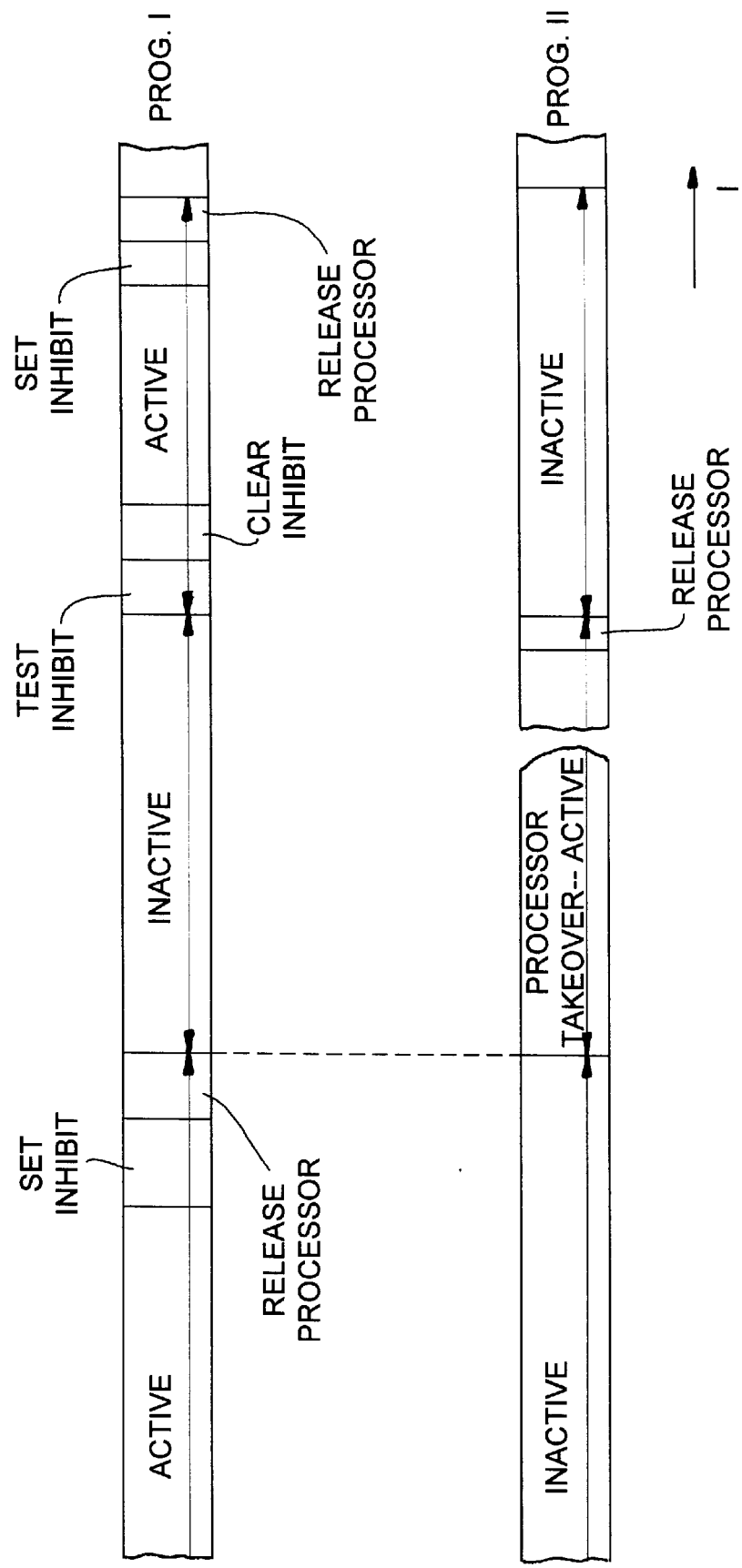
FIG. 2 shows, in very diagrammatic form, the time behavior of the two program complexes which are running on the first processor.

Shown in a block diagram in FIG. 1 is a new system architecture 1 for a process control system (the controlled process itself is not shown and may be a machine tool, a chemical process or the like). This system architecture 1 has a first processor 2 and a second processor 3, which are connected to each other via communication lines 4. Connected to the processor 2, likewise via communication lines 6 and 7, are two stores 5a and 5b which are separate from each other. These two stores 5a and 5b are implemented in hardware terms in storage modules which are physically separated from each other.

At least the first processor 2 has an interrupt controller having an appropriately assigned input 8, to which a clock or a timer 9 is connected.

Depending on the processor architecture chosen, the timer 9 may also be a constituent part of the processor 2 itself.

Two groups 12 and 13 of peripheral means are connected to the first processor 2 via a bus system or corresponding communication lines 11.

Peripheral means should be understood in this case as those hardware devices as are used in the case of process or machine control systems for controlling the process. In this case, a difference is drawn between such peripheral means which merely report items of information from the process which is to be controlled to the control system, and also those peripheral means which convert commands from the control system into state changes in the process, for example by actuating relays, solenoid valves, electromechanical interlocks and the like.

Shown as an example for a peripheral means which merely transmits items of information to the control system is a peripheral means 12a which, for example, transmits temperature or position information to the control system. The part which is framed by the block is intended in this case to symbolize the overall necessary hardware which is required in order to convert the physical signal into the electrical variable which are compatible with the interface, as it is formed by the communication lines 11 and the corresponding input connection of the first processor 2. The access to the peripheral means 12a, this fundamentally being a read access, does not mean, however, that write accesses which bring about state changes within the peripheral means 12a are also possible. A second peripheral means 12b is intended to symbolize all those peripheral means which converts items of information or commands supplied by the first processor 2 via the communication lines 11 into a physical variable. Via the interface means 12b, direct intervention is therefore made into the process which is running and to be controlled, for example by actuating an electromagnetic valve 14 which is indicated in diagrammatic form. Other electromechanical converters, such as direct-current or alternating-current motors, heating devices, ignition devices and the like may likewise be a constituent part of the relevant peripheral means 12b.

The broken line 15 which is drawn between the two peripheral means 12a and 12b is intended to indicate that a much larger number of peripheral means may be present, and is generally in fact present, than only the two peripheral means 12a and 12b.

In addition to the communication lines 11, the two peripheral means 12a and 12b are in each case provided with an inhibit input 16a and 16b, respectively, which is connected to a common inhibit line 17, which connects the inhibit inputs 16a and 16b to a corresponding I/O port 18 of the first processor 2.

The second group of peripheral means is composed in a similar way to the first group 12, that is to say it also comprises peripheral means which supply items of information to the first processor 2, and also peripheral means which convert commands of the first processor 2 into corresponding physical or electrical variables. These peripheral means 13a to 13b of the second group 13 are different on the output side, in the direction of the process to be controlled, from the peripheral means 12a to 12b.

The second processor 3 is used to increase the redundancy, for which reason it differs in terms of hardware from the first processor 2, that is to say it has, for example, a different command set and/or a different register length. Furthermore, it is implemented in a dedicated chip or even arranged on a dedicated printed circuit board. The second processor 3 is connected via communication lines 19 to a store 20 assigned to it, and via further communication lines 22 to a dedicated set of peripheral means 23 which, from the point of view of the process to be controlled, have the same function as the peripheral means 12a to 12b of the first group 12, and which if appropriate, to the extent that the execution of commands is concerned, are logically combined on the output side by an AND operation toward the process, in order that state changes in the process or the machine may only be carried out if the two processors 2 and 3 give the same output commands via the relevant peripheral means 12 and 23, respectively.

With the new system architecture 1 it is possible to allow two different program complexes to run, one program complex being a verified and safety-checked program complex, whereas the other second program complex is a program complex on which less high safety requirements are placed. The safe program complex has a counterpart in the processor 3 and is implemented there with a corresponding program, which is stored exclusively in the store 21 and whose data is likewise stored only in the store 21, to the extent that they do not come from the peripheral means 23 or are not kept there.

The program complex which has been verified and is relevant for the safety of the controlled process, referred to below as the first program complex, runs in the first processor 2, as well as a second program complex, which is not decisive for the safety of the controlled process. The first program complex is implemented by a program or a set of programs which is stored in the store 4. The second program complex, likewise a program or a set of programs, is located in the store 5.

Because it has been checked for safety, the first program complex is authorized and provided for addressing the peripheral means of the second group 12 and outputting via said peripheral means commands which intervene actively in the controlled process or the machine and perform state changes there. An example of such a peripheral means is the peripheral means 12b indicated as an example.

In addition, the first program complex also makes access to the peripheral means 12, which transmit information from the process to the program complex; for example via the peripheral means 12a.

For the further description, let it be initially first assumed that the second program complex interacts exclusively with the peripheral means of the second group 13, that is to say neither obtains data from the first group 12 nor makes write access to these peripheral means of the first group 12. This assumption applies to an error-free design for the second program complex and under the condition that the error-free design has also been used in an error-free manner in the corresponding programs.

For the further functional and sequence description, let it be further assumed that the initialization phase for the program complexes has already run through, and the system is in normal operation. Under these conditions, the first and the second program complex periodically alternate in the first processor 2. The behavior is observed at a time at which, as specified in the upper bar with the designation "Prog. I", the first program complex is active, that is to say is receiving data from the process to be controlled and, if necessary, emitting appropriate commands to the process. At the same time, during this phase the first program complex continuously compares its measured and calculated data with the corresponding data which the program complex running on the second processor 3 obtains from its peripherals or calculates from the data obtained. As long as this comparison shows identity, the system continues to operate. However, if the two processors 2 and 3 determine that there are deviations, the entire process is immediately stopped in accordance with previously defined routines.

If this is not the case, that is to say the data comparison between the two processors 2 and 3 does not allow any error to be detected, the first program complex comes, within a maximum time limit, to a point at which it no longer needs the processor 2. When this point is reached, firstly the inhibit inputs 16a and 16b of the peripheral means of the first group 12 have a blocking signal applied to them by the first program complex via the appropriate output 18. As a result, the peripheral means of the first group 12 change over into a state in which they ignore any write signals, possibly arriving via the communication lines 11, which would change their state. A read access, in the sense that data is interrogated from the peripheral means or the associated interface cards via the communication lines 11, still remains possible, however.

After the first program complex has sent this inhibit signal to its associated peripheral means 12, it releases the first processor 2. The release of the first processor 2 by the first program complex then results in the second program complex, which is stored in the store 5, obtaining the first processor 2 and thus receiving the possibility of operating the peripheral means 13 associated to the second program complex. On the assumption that the second program complex operates in an error-free manner, then it does not make any write access, that is to say state-changing access, to the peripheral means 12, which are reserved for the first program complex. If, because of a programming error or any other error, it does indeed do this or attempt this, the write access has no effect, since the peripheral means 12 are blocked via the inhibit inputs 16a and 16b against write accesses.

Before a predetermined time has expired, the second program complex reaches a program point at which it freely gives up the first processor 2. The first processor 2 can then once more start the first program complex. This first program complex firstly checks whether the peripheral means 12 still have the inhibit signal. The inhibit signal is then cleared, in order that the first program complex can once more communicate normally with its peripheral means 12. The next step carried out is a data comparison between the first program complex of the first processor 2 with the program complex running on the second processor 3 and, in the event that this comparison has not shown any differences, the first program complex proceeds normally on the first processor 2.

On the other hand, if during the reinitialization of the first program complex, the latter should establish that the inhibit signal is no longer present, the first program complex assumes that the second program complex has not behaved in a conformal manner and has attempted in an inadmissible way to output control commands via the corresponding peripheral means 12. Since this is a hazardous error situation, the controlled process is then immediately stopped.

A further error in the second program complex may be that it clears the inhibit signal and then sets it once more in order in the meantime to be able to make write access to the peripheral means 12. Such erroneous behavior is determined by comparing the data from the first program complex with the data which is held by the program complex on the second processor 3. It is thus ensured, with very high safety, that the second program complex, which is not subject to any safety testing, does not interfere with the first program complex, which has been checked for safety, because of design or other errors. Nevertheless, the two program complexes could run on one and the same processor and if appropriate even share those peripheral means via which data are transmitted only in the direction of the relevant processor. The user who is setting up the second program complex can save himself complicated error considerations and error handling routines if he accommodates all the command sequences which are relevant to safety in the first program complex, and he then needs to put complicated error consideration in place only for this program complex. Subsequent changes in the second program complex are readily possible, which significantly simplifies the programming of the new system architecture. In particular, it is sufficient if it is always only the hardware, including the first program complex, which is tested and accepted by the supervising authority. Without this division, the user would be forced to have to have a new check performed by the supervising authority in the case of every small change, even to command sequences not relevant to safety.

The first and the second program complex alternate continuously on the first processor 2 in the manner just described. In so doing, in accordance with a time-slicing method, they obtain the first processor and, assuming freedom from errors, give it up freely once more, also within the time slice. If, however, one of the two program complexes gets into an endless loop, the timer 9 expires before the return of the processor 2, said timer then producing at the interrupt input 8 an interrupt which causes the processor to change over into an alarm routine which aborts the program complex running at that time and, depending on whether the error has been produced in the safety-relevant part or in the non-safety-relevant part, either merely outputs an error message or stops the adjacent system.

Finally, it is possible to allow the two program complexes to communicate with each other via a common storage area 25, for example if the non-safe second program complex needs data which the first, safe program complex has calculated. In order to rule out endangering the first program complex, for this reason the communication area is placed in the store 5b, in which the second program complex is located and where it also keeps its data. Erroneous write accesses into this storage area 25 serving for the communication are likewise not able to impair the verified program complex.

A system architecture uses at least two processors which jointly control a process and continuously compare their data with each other. A program complex which has been checked with respect to the possible errors, as well as a non-checked program complex, run on one of the two processors. In order to rule out interference in the checked program complex by the non-checked one, the peripheral means which interact with the checked program complex are provided with inhibit inputs, and the tested program complex, via the inhibit inputs, blocks the peripheral means which are reserved for it before it gives command to the non-checked program complex.

We claim:

1. A system architecture having a first processor, having first storage means assigned to the first processor, having first peripheral means which are assigned to the first processor and have inputs/outputs and inhibit inputs connected to the first processor said inhibit inputs being used to block the first peripheral means from receiving information from the inputs when an inhibit signal has been transmitted to the inhibit inputs, having a first program complex which runs on the first processor, which is verified with respect to freedom from errors, which interacts at least predominantly with the first storage means of the first processor, and operates in such a way that, when it is running on the first processor, when defined conditions are reached, the first program complex emits an inhibit signal to the peripheral means assigned to the first program complex and releases the first processor, and withdraws or clears the inhibit signal as soon as a the first program complex obtains the first processor back, having second storage means assigned to the first processor, having second peripheral means which are assigned to the first processor and have inputs/outputs connected to the first processor, having a second program complex which runs on the first processor, the active running of the second program complex being nested in time with the active running of the first program complex, on which lower requirements with respect to freedom from errors are placed than on the first program complex, which interacts at least predominantly with the second storage means of the first processor, given error-free running then makes only read access, if at all, to the inputs/outputs of the peripheral means assigned to the first program complex, and when defined conditions are reached, releases the first processor.

2. The system architecture as claimed in claim 1, wherein there is among the first peripheral means at least one which is reserved for the first program complex.

3. The system architecture as claimed in claim 1, wherein there is among the first peripheral means at least one to which it is permissible to have write and/or read access both from the first program complex and from the second program complex.

4. The system architecture as claimed in claim 1, wherein there is a storage area via which the first and second program complexes communicate with each other.

5. The system architecture as claimed in claim 4, wherein the storage area via which the first and the second program complex communicate with each other is located in the first and/or the second storage means or in only one of the two storage means.

6. The system architecture as claimed in claim 1, wherein the first storage means are reserved for the first program complex.

7. The system architecture as claimed in claim 1, wherein the first and the second storage means are realized in hardware terms in a common store, and wherein a first group of storage addresses forms the first storage means and a second group of addresses forms the second storage means.

8. The system architecture as claimed in claim 1, wherein the first and the second storage means are realized in hardware terms in separate stores.

9. The system architecture as claimed in claim 1, wherein the first program complex, when the first processor is obtained back, checks whether the inhibit signal is still present or has not been withdrawn in the meantime, before clearing or withdrawing said signal.

10. The system architecture as claimed in claim 1, wherein the first program complex is a program complex which has a safety function.

11. The system architecture as claimed in claim 1, wherein the first processor has an interrupt controller to which a timer is connected, and wherein a condition which leads to the first program complex obtaining the first processor back is an interrupt triggered by the timer.

12. The system architecture as claimed in claim 1, wherein the condition for the release of the first processor by the relevant program complex is an appropriate program instruction in the relevant program complex.

13. The system architecture as claimed in claim 1, wherein the commands which form the first program complex and/or data which is assigned exclusively to the first program complex are stored in the first storage means.

14. The system architecture as claimed in claim 1, wherein the commands which form the second program complex and/or data which is assigned exclusively to the second program complex are stored in the second storage means.

15. The system architecture as claimed in claim 1, further comprising a second processor, third storage means assigned to the second processor, third peripheral means which are assigned to the second processor and have inputs/outputs connected to the second processor, and a third program complex, running on the second processor, which interacts with the third storage means and communicates with the third peripheral means.

16. The system architecture as claimed in claim 15, wherein the first and the second processor are different from each other.

17. The system architecture as claimed in claim 15, wherein the third program complex behaves, from the point of view of the third peripheral means, predominantly or exactly as does the first program complex from the point of view of the peripheral means of the first program complex, to the extent that the latter coincide in functional terms with the third peripheral means.

18. The system architecture as claimed in claim 15, wherein the first and the third program complex, apart from any possible communication with the second program complex, are intended to furnish the same function.

19. The system architecture as claimed in claim 15, wherein the first and the third program complex communicate with each other at least from time to time.

20. The system architecture as claimed in claim 15, wherein the communication comprises the comparison of data calculated by each of the two program complexes, and of data which is or has been supplied by the associated peripheral means.

21. The system architecture as claimed in claim 15, wherein there are still further processors and program complexes present.

22. The system architecture as claimed in claim 1, wherein the system architecture is implemented in a machine control system.

* * * * *